Sept. 3, 1940. H. F. TÖNNIES 2,213,642
PHOTOGRAPHIC EXPOSURE APPARATUS
Filed Nov. 8, 1938
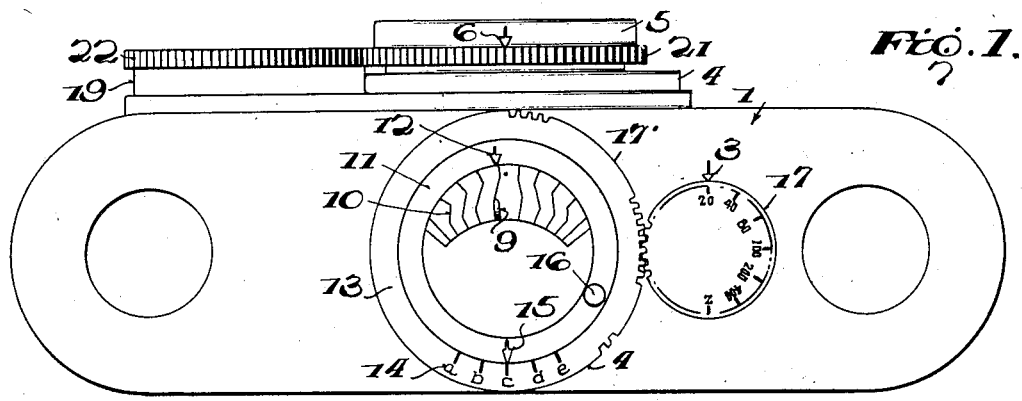
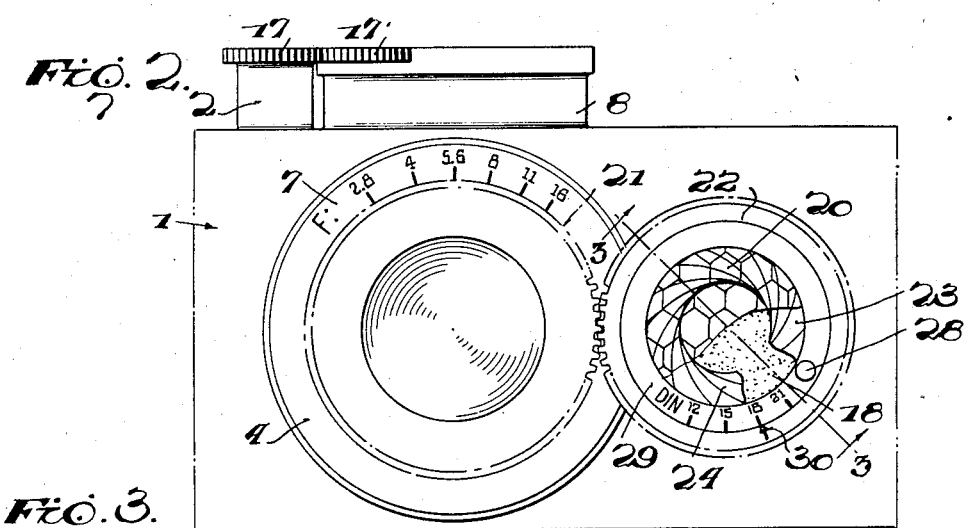
Inventor:
Hans Ferdinand Tönnies
By Potter, Pierce & Scheffler,
Attorneys.

Patented Sept. 3, 1940

2,213,642

UNITED STATES PATENT OFFICE 2,213,642

PHOTOGRAPHIC EXPOSURE APPARATUS

Hans Ferdinand Tönnies, Hamburg-Grossflottbek, Germany

Application November 8, 1938, Serial No. 239,560
In Germany September 4, 1937

9 Claims. (Cl. 88—23)

This invention relates to photographic exposure apparatus and particularly to apparatus, for use with still and motion picture cameras, of the type including a sensitive ammeter, a photoelectric cell and current modulating devices coupled to the exposure-determining mechanism of a camera.

The usual exposure mechanism includes an iris diaphragm and a shutter that are each adjustable to control the quantity of light that reaches the film. The present invention contemplates apparatus in which the adjusting members of the exposure mechanism of the camera are coupled, respectively, to an adjustable indicator on the ammeter and to a current modulating device in the photoelectric system.

This application is a continuation-in-part of my copending application, Ser. No. 227,579, filed August 30, 1938, for "Photographic exposure apparatus." The apparatus described in that application includes mechanisms for adjusting the sensitivity of the photoelectric elements to different values for the determination of the exposure time for automatic and for manual operation, respectively, of the camera shutter. The present invention relates to apparatus of that general type in which the sensitivity-adjusting mechanism is incorporated in an iris diaphragm device for controlling the effective area of the photoelectric cell, and to other applications of the iris diaphragm device to photographic exposure apparatus.

An object of the present invention is to provide photographic exposure apparatus including a photoelectric cell connected to a measuring instrument, an iris diaphragm device, for controlling the effective area of the cell, and a mechanical coupling between the iris diaphragm device and an adjustable setting member of the exposure apparatus (diaphragm and shutter mechanisms) of the camera lens, the mechanical coupling being adjustable to vary the control exerted upon the iris diaphragm device by the setting member of the exposure apparatus. An object is to provide apparatus of the type stated in which the iris diaphragm includes a pair of concentric angularly adjustable members in frictional engagement, one member being actuated by the setting member of the exposure apparatus and the other being connected to the diaphragm blades for adjusting the same, whereby relative adjustment of the members alters the iris diaphragm opening for a given adjustment of the setting member of the exposure apparatus. Further objects are to provide apparatus of the type stated in which the members that provide the adjustable mechanical coupling between the iris diaphragm devices of the photoelectric cell and the setting member of the exposure apparatus carry indicia significant of different exposure conditions, such as different emulsion speeds or different ranges of exposure times, for which different sensitivities of the photoelectric system are appropriate.

These and other objects and advantages of the invention will be apparent from the following specification when taken with the accompanying drawing in which:

Fig. 1 is a plan view of a camera provided with an embodiment of the invention;

Fig. 2 is a fragmentary front elevation of the same;

Fig. 3 is a sectional view, on an enlarged scale, substantially on line 3—3 of Fig. 2; and Fig. 4 is a diagrammatic view of another embodiment of the invention.

In the drawing, the reference numeral 1 identifies the casing of a small roll film camera having a focal plane shutter, not shown, that may be set for time or instantaneous exposures of desired speed by adjustment of the knob 2 with reference to the fiducial mark 3 that is fixed to the camera casing. The lens mount 4 houses the iris diaphragm, not shown, that has a rotatable adjusting ring 5 carrying a mark 6 for cooperation with a scale of stop values 7 on the lens mount 4. The parts so far described are or may be of any conventional design.

In accordance with this invention, the adjustable devices 2 and 5 of the camera exposure mechanism are mechanically coupled to adjustable members of a photoelectric exposure meter that is mounted on the camera casing. The measuring instrument of the exposure meter is a sensitive direct current galvanometer or milliammeter within a case 8 that is secured to the top wall of the camera casing adjacent the shutter setting knob 2. The instrument includes a pointer 9 that is movable over a scale plate 10 that bears a series of approximately radial lines whose outer ends are uniformly spaced and whose inner ends are spaced by corresponding but unequal displacements of the instrument needle. An indicator ring 11 at the top of the instrument case 8 carries an indicator mark 12, the ring being angularly adjustable to displace the mark 12 along the outer ends of the radial marks of the scale plate. The ring 11 is within and frictionally held to an outer ring 13 which carries a scale 14 that may be graduated in values of different factors affecting exposure, as will be explained hereinafter, the graduations being identified on the drawing by the markings "a," "b," etc. The indicator ring 11 carries a mark 15 that may be set at the appropriate graduation of scale 14 by pressure exerted on knob 16 to overcome the frictional engagement of the two ring members.

The shutter setting knob 2 has a crown gear 17 in mesh with a gear sector 17' that is fixed to or formed on the outer ring 13 of the measuring instrument. Adjustment of the shutter speed therefore results in an angular adjustment of the outer ring 13, and thereby of the indicator ring 11 which is in frictional engagement with the outer ring.

The photoelectric cell 18, preferably of the barrier layer or current-generating type is mounted in a housing 19 adjacent the lens mount 6 at the front of the camera case. A shallow multiple lens plate 20 is arranged in front of the cell to restrict the light rays reaching the cell to an angular spread substantially equal to a preselected image angle of the camera. A gear 21 on the diaphragm adjusting ring 5 of the lens mount meshes with a gear 22 on the cell housing, the gear 22 being frictionally connected to the adjustable member 23 that controls the diaphragm blades 24 of an iris diaphragm mechanism. As shown in Fig. 3, the member 23 has springs 25 secured thereto which bear upon the lower face of the gear ring 22 to provide the frictional engagement that insures the simultaneous movement of the concentric gear ring 22 and annular member 23 when gear ring 22 is rotated by an adjustment of the setting mechanism of the iris diaphragm of the camera lens. The diaphragm blades 24 are pivoted on studs 26 carried by a housing 19, and are engaged at their opposite ends by studs or pins 27 on the adjusting member 23.

The member 23 may be adjusted angularly with respect to the gear ring 22 by holding the ring 22 and applying pressure to the knob 28 that is fixed to the ring member 23. Ring members 22, 23 having cooperating indicia comprising a scale 29 of emulsion speeds, for example "DIN" values, and a fiducial mark 30. As illustrated, the DIN graduations are on the ring member 23 and the mark 30 is on the gear ring 22, but the relative location of the cooperating indicia is not important.

The described apparatus is employed for a semi-automatic adjustment of the exposure apparatus of the camera by a manual adjustment of the camera diaphragm and shutter to bring the instrument pointer 9 in line with the mark 12 on the indicator ring 11. The position of the indicator ring 11 with respect to the outer ring 13 is first adjusted in accordance with the exposure factor of the graduated scale 14. The values denoted by scale 14 may be filter factors and/or camera angle, if the camera is of the type which has interchangeable lenses. Arbitrary designations such as shown on scale 14 may be used with a tabulation of filter factors and camera angles, or the graduations may be "2x," "4x," etc., if this adjustment provides only for variation in filter factor or the graduations may be in degrees if the adjustment provides only for changes in the camera lens angle. As illustrated, the mark 15 is set at graduation "c" of scale 14. The iris diaphragm of the photoelectric cell is then set in accordance with the emulsion speed by holding the gear ring 22 and rotating the inner ring 23 to bring the appropriate graduation of scale 29, as shown by the DIN value "18," in line with the mark 30. The next adjustment may be of either the shutter speed or the diaphragm opening. If an exposure of 1/20 of a second is desired, the knob 2 is rotated to aline the graduation "20" with the mark 3, thus setting the indicator mark at the illustrated position. The camera is then directed at the scene or object to be photographed and the camera diaphragm is adjusted by turning the ring 5 to that value for which the corresponding adjustment of the photocell iris diaphragm brings the instrument pointer 9 into line with the indicator mark 12. Alternatively, the camera diaphragm may be set at a desired value, thus adjusting the iris diaphragm of the photocell to bring the pointer 9 to a position determined by the brightness of the scene, and the shutter speed knob 2 may then be adjusted to aline the indicator mark 12 with the instrument pointer.

The construction may be simplified by omitting the ring 13 of the instrument and gearing the indicator ring 11 directly to the shutter speed knob 2 when the camera has a fixed lens system and no provision is to be made for the use of filters that necessitate an increase in the exposure time.

The embodiment of the invention that is illustrated in Fig. 4 permits a semi-automatic setting of the camera exposure apparatus for automatically timed exposures, i. e. "snap shots," and a determination of the proper exposure time for manually controlled exposures. The lens housing 31 of the camera carries the shutter and diaphragm mechanisms that are adjusted by the ring 32 and the pointer 33, respectively. The shutter setting ring 32 has a scale 34 of automatically timed exposures, for example, exposures of from 1 second to 1/200 of a second, also markings "T" and "B" indicating adjustments for time and bulb exposures, respectively. The lens housing 31 carries a mark 35 for cooperation with scale 34 and a scale 36 of diaphragm openings for cooperation with the pointer 33. The shutter setting ring 32 has a gear section 37 meshing with the ring gear 22' of the iris diaphragm mechanism in front of the photocell 18, and the diaphragm adjusting member 23' is frictionally held to the gear ring 22'. Ring member 23' may be angularly adjusted within the ring gear 22' by means of a handle 28' to set the mark 38 of member 23' in line with the indicia on ring gear 22' that carry legends "I" and "T," respectively, designating instantaneous or manually timed exposures. The photoelectric cell is connected to a measuring instrument having an indicator ring 11' carrying a mark 12' and a scale 39 of diaphragm values cooperating with a scale 40 of emulsion speed values on a fixed ring 41. The indicator ring 11' has a further scale 42 of exposure time values of from about 1 second to higher values.

The apparatus is employed in the following manner to set the camera exposure apparatus for automatically timed exposures or to determine the exposure time for manually timed exposures. Indicator ring 11' is adjusted within the fixed ring 41 to set the selected diaphragm opening value of scale 39 in line with the emulsion speed value on scale 40. Adjusting ring 23' of the photocell iris diaphragm is set to aline the mark 38 with the instantaneous exposure mark I of the ring gear 22', and the camera lens diaphragm pointer 33 is set at the selected stop opening on scale 36. The camera is then directed towards the scene and the shutter speed setting ring 32 is adjusted to bring the pointer 9 of the instrument into line with the indicator mark 12'.

If the scene brightness is below that value which deflects the instrument pointer into line with indicator mark 12', the adjusting ring 23' of the photocell iris diaphragm is turned to aline the mark 38 with the "time" exposure mark T, and the shutter setting ring 32 of the camera lens is turned to aline the "T" or "B" mark with the fixed mark 35 on the lens housing. The position of the instrument pointer 9 with respect to the "time" scale 42 then indicates the proper exposure time for a manually controlled exposure.

The cooperating indicia 38, I, T of the iris diaphragm device are so related that the diaphragm opening is increased when mark 38 is moved from the "instantaneous exposure" mark I to the "time exposure" mark T. The brightness values that permit automatically timed exposures provide ample current from the photoelectric cell for actuating the instrument at the lower sensitivity range but the maximum sensitivity is available to obtain significant instrument readings in the lower range of brightness values that necessitate manually timed exposures.

Both of the described forms of the invention include means for varying the effective photocell area as a function of the diaphragm opening or the shutter speed of the camera exposure apparatus, and independently adjustable means for determining the limits between which the effective cell area may be controlled by the first adjusting means. The apparatus of Figs. 1 and 2 provides a variation of cell area or current modulation in accordance with changes in the diaphragm opening of the camera lens, the range of cell area variation or current modulation being determined in accordance with the emulsion speed of the film. The Fig. 4 apparatus provides a variation of cell area or current modulation in accordance with shutter speed, the range of current variation being set at a low value when automatically timed exposures are to be made and at a higher value when manually timed exposures are to be made.

It is to be understood that the invention is not limited to the specific embodiments herein shown and described, and that there is considerable latitude in the design and construction of individually adjustable mechanisms for varying the effective cell area and for determining the range of values between which the cell area may be varied.

I claim:

1. In a photoelectric system for ascertaining an appropriate setting for the exposure apparatus of a camera, the combination with photosensitive means for generating an electric current, a measuring instrument having a pointer, adjustable indicator means having a fiducial mark for alinement with the instrument pointer, cooperating indicia movable relatively to each other with changes in the setting of said indicator means, one of said indicia being a scale graduated in value of one of the factors of exposure times and diaphragm openings that may be controlled by the exposure apparatus of the camera, of mechanism to adjust the current output from the photoelectric means to the instrument; said mechanism including adjustable means calibrated in values of the other of said exposure factors for varying the effective area of the photoelectric means, and independently adjustable means calibrated in values of a third exposure factor for determining the limits between which the effective cell area may be varied by said first adjustable means.

2. In a photoelectric system for ascertaining an appropriate setting for the exposure apparatus of a camera, the invention as claimed in claim 1, wherein said indicator means includes two relatively adjustable members, and cooperating indicia on said members for setting the same in different angular relations in accordance with different values of a further exposure factor.

3. In a photoelectric system for ascertaining an appropriate setting for the exposure apparatus of a camera, the invention as claimed in claim 1, wherein said indicator means includes two relatively adjustable members, and cooperating indicia on said members for setting the same in different angular relations in accordance with different filter factor values.

4. In a photoelectric system for determining the setting of the exposure apparatus of a camera, the combination with a photoelectric cell, and a measuring instrument connected to the photoelectric cell, said instrument having a pointer and adjustable indicating means having a fiducial mark for alinement with said pointer, cooperating indicia relatively movable with adjustments of said indicator means, one of said indicia being a scale graduated in values of one of the exposure factors, viz., exposure time or diaphragm opening, that may be set on the camera exposure apparatus, of mechanism for adjusting the effective area of the cell; said mechanism including means adjustable in accordance with the other of said exposure factors to vary the effective cell area, independently adjustable means determining the limits between which the effective cell area may be varied by adjustment of said first means, and cooperating indicia including graduations of a third exposure factor for setting said independently adjustable means in accordance with a selected value of the third exposure factor.

5. In photographic exposure determining apparatus for use with the exposure apparatus of a camera, the combination with a photoelectric cell, a measuring instrument connected to said cell and having a pointer cooperating with indicating means, and means for adjusting said indicating means in accordance with one of the factors, viz., exposure time and diaphragm opening that may be set on said exposure apparatus, of an iris diaphragm mechanism for varying the effective area of said photoelectric cell; said mechanism including diaphragm blades, a member movable to adjust said blades, a second movable member, cooperating indicia relatively movable with adjustments of said second member and comprising a setting mark and a scale graduated in values of the other of said exposure factors, cooperating indicia on said members for setting the same in different angular relations, and means frictionally coupling said members for simultaneous movement.

6. In photographic exposure determining apparatus, the invention as claimed in claim 2, wherein the cooperating indicia on said members comprise a setting mark and a scale of film speed values.

7. In photographic exposure determining apparatus, the invention as claimed in claim 5, wherein said indicating means of the measuring instrument carries a scale of exposure times corresponding to manual operation of the camera exposure apparatus, and the cooperating indicia on said members comprise symbols indicating settings for the determination of manually and automatically timed exposures respectively.

8. In photoelectric exposure determining apparatus, a photoelectric cell, a measuring instrument connected to said cell, and an iris diaphragm device for controlling the effective area of said cell; said device including a plurality of diaphragm blades, a pair of movable members, means frictionally coupling said members for simultaneous movement, means coupling one of said members to said blades for actuating the same, cooperating indicia on said members for setting the relative positions of the same in accordance with an exposure condition, and indicating means for setting the other member in accordance with one of the exposure factors, viz., exposure time and diaphragm opening, controlled by the exposure apparatus of a camera.

9. In photoelectric exposure determining apparatus, a photoelectric cell, a measuring instrument connected to said cell, and an iris diaphragm device for controlling the effective area of said cell; said device comprising a casing for housing the cell, a plurality of diaphragm blades, a pair of concentric ring members each movable angularly with respect to the casing, means connecting the inner ring member to said blades to actuate the same, means frictionally coupling said ring members to each other, cooperating indicia on said ring members for setting their relative angular positions in accordance with a selected exposure condition, and means on the outer ring member adapted to couple the same to an adjustable setting element of a camera exposure apparatus.

HANS FERDINAND TÖNNIES.

CERTIFICATE OF CORRECTION.

Patent No. 2,213,642.   September 3, 1940.

HANS FERDINAND TÖNNIES.

It is hereby certified that error appears in the printed specification of the above numbered patent requiring correction as follows: Page 3, second column, line 69, claim 6, for the claim reference numeral "2" read --5--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.